A modified polyolefin composition having excellent physical properties such as bending rigidity, bending strength, impact strength, and the like can be prepared by melting and kneading a mixture of a radical generating agent such as benzoyl peroxide, a porous filler, and a polyolefin composed primarily of propylene and, if necessary, a polar vinyl monomer at a high temperature above the decomposition temperature of the radical generating agent.

9 Claims, No Drawings

POLYPROPYLENE COMPOSITION MODIFIED WITH POROUS FILLER AND A RADICAL GENERATING AGENT

BACKGROUND OF THE INVENTION

The present invention relates to modified polyolefin compositions having improved mechanical strength.

It has been heretofore known that the mechanical, chemical, electrical, and thermal properties of polyolefin resins can be improved by admixing fillers such as wood powder, chaff, and calcium carbonate into the resins. However, because of their hydrophilic property, this type of fillers has low compatibility with the polyolefin resins which are hydrophobic. Therefore, mere blending and kneading of the two kinds of materials cannot provide satisfactory composite products. Various attempts have been made to improve the "compatibility" between such fillers and the polymer matrix. One method comprises coating the surface of the fillers with various materials or reacting such materials with the fillers to promote the "compatibility." Another method includes kneading surface active agents into the polymer matrix. In addition, the use of polymers having a polar group as the polymer matrix has been practiced.

However, these methods require a coating process, a special reaction process, or the addition of a large quantity of a surface active agent, thereby resulting in increasing the complexity of the processes and higher cost.

We have studied the compatibility between these fillers and the polyolefins by means of an electron microscope and have found that even with the introduction of polar groups into the polymer matrix, ample penetration of the matrix into the micro voids of the fillers cannot be attained.

On the basis of this knowledge, we have made various attempts to make the fillers and the polymer matrix compatible with each other. As a result, we found that when a radical generating agent and wood powder are added to a polyolefin composed primarily of propylene, and the mixture is kneaded at an increased temperature, the polyolefin penetrates well into the micro voids (passageways) of the wood powder, thereby improving the properties of the polyolefin.

Additionally, we found that when the radical generating agent is used in conjunction with an appropriate amount of a polar vinyl monomer, the penetration of the polyolefin into the micro voids of the wood powder is promoted, whereby the physical properties of the polyolefin composite are further improved together with the polarization of the matrix.

Similar results can be obtained with the use of other porous fillers such as finely divided chaff, zeolite, and the like instead of the wood powder.

SUMMARY OF THE INVENTION

It is an object of this invention to provide modified polyolefin compositions composed mainly of propylene and having improved mechanical strength.

Such modified polyolefin compositions can be obtained by melting and kneading at a high temperature a mixture of a radical generating agent such as an organoperoxide, a porous filler such as wood powder, chaff, sepiolite, zeolite, or the like, and a polyolefin composed mainly of propylene.

In accordance with the present invention, when a mixture of the radical generating agent, porous filler, and polyolefin composed primarily of propylene is melted and kneaded at a high temperature above the decomposition temperature of the radical generating agent, low molecular polymers capable of penetrating into the microvoids of the porous filler are formed in the polymer matrix, and the polymer matrix is polarized, thereby producing an intimately blended composite of the filler and the matrix, whereby the quality of the resulting polyolefin composite is highly improved.

DETAILED DESCRIPTION

The polyolefins usable for the present invention are crystalline polymers composed primarily of propylene. The isotactic index (percentage of extractable portion with boiling n-heptane) of the crystalline polymers is preferably not less than 80%. One typical example of such polymers is isotactic polypropylene. Other illustrative examples include copolymers, preferably resinous copolymers, of propylene and a small amount, for example, 15% by weight based on the copolymer, of another $\alpha$-olefin such as ethylene and butene - 1, and mixtures of polypropylene or said copolymer and a polymeric material compatible therewith.

The amount of the polyolefin used is in the range from 90 to 20% by weight, preferably 80 to 40% by weight, based on the total weight of the polyolefin, the radical generating agent and the porous filler.

A radical generating agent suitable for use in the present invention should be one which decomposes on heating and serves to cut the polypropylene chain. Various organic and inorganic peroxides, azo and diazo compounds, aromatic sulfonic acids, alkyl mercuries and alkyl leads which are generally known as radical generating agents have such properties. Illustrative examples of such radical generating agents include benzoyl peroxide, di-t-butyl peroxide, dioctyl peroxide, azo-bis-isobutyro nitrile and diazoaminobenzene. The quantity of the radical generating agent added should not be greater than 5% by weight, preferably from 0.5 to 0.01 % by weight (based on the total weight of the polyolefin, the radical generating agents and the porous filler). As excessive quantity of the radical generating agent will remarkably increase the degradation of the polymer, resulting in decreased impact resistance of the resulting polymer composition.

For the porous filler, a filler having open voids or cracks distributed therein is suitable. Examples of suitable fillers are cellulose-type fillers such as wood powder and chaff powder, and inorganic fillers such as natural or synthetic zeolites, sepiolite, diatomaceous earth and attapulgite. Fillers having no voids cannot afford the advantages of the present invention because they do not permit penetration of the polymer. The voids are preferably microscopic in the range of 0.01 to 10 $\mu$ in size as measured by means of a microscope. The shape of the microvoids is not particularly critical. Experience teaches that a porous filler having a specific area of not less than 100 $m^2$ per gram can provide good results.

For reasons of kneadability, formability and ease of penetration into the voids of a molten polymer, the porous filler is preferably finely divided into particles having a particle size not greater than 5 mesh, preferably not greater than 80 mesh (as measured by Tyler standard sieves).

The quantity of the porous filler used should be from 10 to 80% based on the total weight of the polyolefin, the radical generating agent, and the porous filler. In the case where the quantity of the porous filler is less than 10%, improved mechanical properties cannot be obtained. On the other hand, when the quantity of the porous filler is greater than 80%, the resulting composition becomes brittle and poor in formability. For reasons of a balance between rigidity, hardness and formability, the porous filler is preferably used particularly in an amount of 20 to 60% by weight.

The above-mentioned materials are kneaded in the following manner. That is, the polyolefin composing the matrix, the porous filler and the radical generating agent are melted and kneaded at a high temperature above both the melting point of the polyolefin and the decomposition temperature of the radical generating agent. In the case where the radical generating agent additive is a liquid, it is preferably sprayed on the polyolefin or the filler either directly or in a solution of any suitable solvent and the resultant mixture is then kneaded. Kneading may be carried out by a conventional kneading method using a roller, a Banbury mixer, a kneader, various moulding machines, an extruder, or the like. It is desirable that the materials be thoroughly and uniformly blended before melting and kneading.

In order to obtain further improved mechanical strength, a polar vinyl monomer may be added to the starting material composition of the radical generating agent, porous filler, and polyolefin, the resulting mixture being further blended and kneaded together.

The polar vinyl monomers to be admixed include vinyl monomers containing ionic or hydrogen bond-forming functional groups or elements such as carbonyl, carboxyl, amino, cyano, epoxy and hydroxyl groups, and halogens. Polar vinyl monomers having the property of not polymerizing alone and/or a high affinity for the wood powder are especially suitable in the present invention. Illustrative examples of the polar vinyl monomer include acrylic acid and esters thereof, methacrylic acid and esters thereof, N-methylacrylamide, vinyl chloride, maleic anhydride, itaconic anhydride and the like. Among these polar vinyl monomers used in the present invention, maleic anhydride and itaconic anhydride each of which cannot polymerize alone and N-methylacrylamide and glycidyl methacrylate which have a high affinity for the wood powder are particularly preferred.

The amount of the polar vinyl monomer added is from 0.01 to 15% by weight, preferably 0.1 to 3% by weight, based on the total weight of the polyolefin, the radical generating agent, and the porous filler plus the polar vinyl monomer.

If a polar vinyl monomer is used, kneading is desirably carried out in a substantially sealed system (for example, in an extruder) so as to avoid its excessive vaporization under the conditions of heating and kneading.

The composition of the present invention is obtained by kneading the above-mentioned materials at a temperature higher than the decomposition temperature of the radical generating agent. The term "decomposition temperature of the radical generating agent" as used herein designates the temperature at which the agent substantially decomposes. With a combination of the polyolefin and radical generating agent used in the present invention, a temperature higher than the melting point of the polyolefin simultaneously corresponds to a temperature higher than the decomposition temperature of the radical generating agent. If the kneading of the polyolefin is carried out at a temperature of 170° to 190°C, a kneading period of from 5 sec. to 2 min. may be used in the case of benzoyl peroxide being used as a radical generating agent. It will be apparent, however, that the combination of temperature and time may vary over a wider range.

The composition obtained according to the present invention has considerably better mechanical properties than a composition obtained by a mere kneading of the polymer matrix and the filler. The product according to the present invention may be formed into a pellet or a shaped material of any other configuration and used as a raw material for injection moulding, extrusion moulding and/or other moulding methods wherein a polyolefin is forced to undergo a molten state.

In order to indicate more fully the nature and utility of this invention, the following specific examples of its practice are set forth, it being understood that these examples are presented as illustrative only and that they are not intended to limit the scope of the invention.

EXAMPLE 1

Various proportions of polyolefins, fillers, and radical generating agents were blended as indicated in Table 1. The resulting mixtures were kneaded in a 40 mm. diameter extrusion pelletizing machine at a temperature of 170° to 190°C and then extruded into plates 3 mm. thick and 50 mm. wide through a 40 mm. diameter extrusion molding machine. The physical properties of the resulting plates were measured. The sample into which calcium carbonate having no microvoids was admixed gave no definite results.

The kneading process as described above will be specifically described with reference to the eighth sample in Table 1. Substantially the same procedure as described below was carried out with the other samples except for the composition.

5.00 kg of wood powder (hemlock wood, passing through a screen of 80 mesh size and a moisture content of less than 1%), 4.99 kg of powdery polypropylene (having a melt index (M.I.) of 5 and a specific gravity of 0.905), and 10 g of benzoyl peroxide (JIS first class reagent) were respectively weighed and then placed in a super mixer having a capacity of 75 l. These materials were uniformly mixed by agitation at a rotational speed of 3,540 r.p.m. for 3 minutes. The resulting mixture (in the form of a powder) was kneaded in a 40 mm. diameter extrusion pelletizing machine (equipped with a Dulmage-type acrew (L/D = 22), manufactured by Mitsubishi Juko K.K.) under the following conditions.

| Kneading condition: | | |
| --- | --- | --- |
| Temperature: | feed part: | 150°C |
| | metering part: | 185°C |
| | die part: | 180°C |
| Rotational speed of the screw: | | 40 r.p.m. |
| Discharge: | | 5 kg/hr. |

Table 1

| Composition | | | | | |
|---|---|---|---|---|---|
| Filler | Wt.% | Polyolefin | Wt.% | Radical generating agent | Wt.% |
| Wood powder | 50 | Polyethylene*11 | 50 | — | 0 |
| " | " | " | 49.9 | Benzoyl*8 Peroxide | 0.1 |
| Calcium*13 carbonate | " | Polypropylene | 50 | — | 0 |
| " | " | " | 49.9 | Benzoyl*8 peroxide | 0.1 |
| Wood*6 powder | 50 | Polypropylene*7 | 50 | Benzoyl*8 peroxide | 0 |
| " | " | " | 49.99 | " | 0.01 |
| " | " | " | 49.95 | " | 0.05 |
| " | " | " | 49.9 | " | 0.1 |
| " | " | " | 49.5 | " | 0.5 |
| " | " | " | 49.9 | Dioctyl*9 peroxide | 0.1 |
| " | " | " | 49.9 | Azobisiso-*10 butyronitrile | 0.1 |
| Chaff*12 | " | Polypropylene*7 | 50 | — | 0 |
| " | " | " | 49.9 | Benzoyl*8 peroxide | 0.1 |

| Mechanical properties | | | | | |
|---|---|---|---|---|---|
| Bending*1 rigidity kg/cm² | Bending*2 strength kg/cm² | Charpy*3 impact kg.cm/cm² | Rockwell*4 hardness (L) | Tensile*5 strength kg/cm² | Note |
| 32,000 | 300 | 2.0 | 55 | | Reference example |
| 30,000 | 280 | 2.5 | 55 | | |
| 26,000 | 300 | | | 160 | Reference |
| 27,000 | 300 | | | 170 | |
| 33,000 | 310 | 1.6 | 65 | | |
| 35,000 | 320 | 1.6 | 70 | | |
| 41,000 | 490 | 1.7 | 80 | | |
| 45,000 | 580 | 1.8 | 83 | | |
| 43,000 | 600 | 2.1 | 80 | | |
| 44,000 | 350 | 1.7 | 80 | | |
| 46,000 | 590 | 1.8 | 83 | | |
| 35,000 | 350 | 1.6 | 65 | | |
| 48,000 | 600 | 2.0 | 85 | | |

| Composition | | | | | |
|---|---|---|---|---|---|
| Filler | wt.% | Polyolefin | Wt.% | Radical generating agent | Wt.% |
| Wood powder | 80 | Polypropylene | 20 | — | 0 |
| " | 60 | " | 40 | —0 | |
| " | 40 | " | 60 | — | 0 |
| " | 20 | " | 80 | — | 0 |
| " | 10 | " | 90 | — | 0 |
| " | 80 | " | 19.95 | Benzoyl peroxide | 0.05 |
| " | 60 | " | 39.95 | " | 0.05 |
| " | 40 | " | 59.95 | " | 0.05 |
| " | 20 | " | 79.95 | " | 0.05 |
| " | 10 | " | 89.95 | " | 0.05 |

| Mechanical properties | | | | | |
|---|---|---|---|---|---|
| Bending rigidity kg/cm² | Bending strength kg/cm² | Charpy impact kg.cm/cm² | Rodkwell hardness (L) | Tensile strength kg/cm² | Note |
| 42,000 | 150 | 1.4 | 40 | | |
| 37,000 | 280 | 1.5 | 45 | | Reference example |
| 31,000 | 360 | 2.2 | 75 | | |
| 24,000 | 470 | 2.3 | 75 | | |
| 16,000 | 500 | 2.8 | 69 | | |
| 54,000 | 450 | 1.3 | 70 | | |
| 46,000 | 490 | 1.5 | 75 | | |
| 33,000 | 470 | 1.7 | 83 | | |
| 25,000 | 510 | 1.8 | 83 | | |

Table 1-continued

| 19,000 | 540 | 2.5 | 78 |

*¹ASTM D-790
*²ASTM D-790
*³ASTM D-256
*⁴ASTM D-785
*⁵ASTM D-638
*⁶Hemlock wood, passing through a screen of 80 mesh size
*⁷M.I. = 5, Density = 0.905
*⁸ First class reagent
*⁹First class reagent
*¹⁰First class reagent
*¹¹M.I. = 5, Density = 0.965
*¹²Passing through a screen of 80 mesh size
*¹³First class reagent

EXAMPLE 2

Various polyolefin compositions were prepared according to the same procedures as those described in Example 1 except that different kinds of polar vinyl monomers were further added (by spraying in the case of liquid vinyl monomers). The results are shown in Table 2.

Table 2

| Composition | | | | | | | | Mechanical properties | | | |
|---|---|---|---|---|---|---|---|---|---|---|---|
| Filler | Wt.% | Polyolefin | Wt.% | Radical generating agent | Wt.% | Vinyl monomer | Wt.% | Bending rigidity kg/cm² | Bending strength kg/cm² | Charpy impact kg.cm/cm² | Rockwell hardness (L) |
| Wood powder | 50 | Polypropylene | 49.9 | Benzoyl peroxide | 0.1 | | | 45,000 | 580 | 1.8 | 83 |
| ″ | ″ | ″ | 49.85 | ″ | ″ | Maleic*¹ anhydride | 0.05 | 48,000 | 600 | 1.8 | 84 |
| ″ | ″ | ″ | 49.8 | ″ | ″ | ″ | 0.1 | 50,000 | 650 | 2.0 | 86 |
| ″ | ″ | ″ | 49.4 | ″ | ″ | ″ | 0.5 | 50,000 | 700 | 1.8 | 85 |
| ″ | ″ | ″ | 49.8 | ″ | ″ | Glycidyl*² methacrylate | 0.1 | 48,000 | 670 | 1.8 | 84 |
| ″ | ″ | ″ | 49.8 | ″ | ″ | Acrylic*³ acid | 0.1 | 49,000 | 660 | 1.9 | 84 |
| ″ | ″ | ″ | 49.8 | ″ | ″ | Methyl*⁴ methacrylate | 0.1 | 48,000 | 640 | 1.8 | 83 |
| ″ | ″ | Propylene-*⁵ ethylene copolymer | 49.9 | ″ | ″ | ″ | | 39,000 | 570 | 2.4 | 75 |
| ″ | ″ | ″ | 49.8 | ″ | ″ | Maleic anhydride | 0.1 | 44,000 | 630 | 2.7 | 79 |

*¹⁻⁴First class reagent
*⁵MI= 0.9
Ethylene content 13 wt.%

We claim:

1. A process for preparing a modified polyolefin composition for shaping use which comprises adding a radical generating agent in a quantity of not greater than 5% by weight to 10 to 80% by weight of a porous filler having a particle size not greater than 5 mesh and 90 to 20% by weight of a polyolefin selected from the group consisting of propylene homopolymer and ethylene-propylene copolymers with an ethylene content not greater than 15%, all of said quantities of these materials being based on the total weight of the polyolefin, porous filler and radical generating agent, and kneading the resulting mixture at a high temperature above the decomposition temperature of the radical generating agent and the melting temperature of the polyolefin.

2. The process, according to claim 1, wherein the porous filler is a cellulosic powder.

3. The process according to claim 2 wherein the cellulosic powder is wood powder.

4. The process according to claim 1 wherein the radical generating agent is an organic peroxide.

5. The process according to claim 3 wherein the quantity of the wood powder is 20 to 60% by weight, and the quantity of the polyolefin is 40 to 80% by weight based on the total weight of polyolefin, cellulosic powder, and radical generating agent.

6. The process according to claim 1 wherein the wood powder has a particle size of not greater than 80 mesh by Tyler standard sieve.

7. The process according to claim 1 wherein the melting and kneading of the mixture takes place in the presence of a polar vinyl monomer in a quantity of 0.01 to 15% by weight based on the total weight of the polyolefin, porous filler, radical generating agent, and polar vinyl monomer.

8. The composition according to claim 7 wherein the polar vinyl monomer is selected from the group consisting of acrylic acid and esters thereof, N-methylacrylamide, vinyl chloride, maleic anhydride, itaconic anhydride, and glycidyl methacrylate.

9. The process according to claim 7 wherein the polar vinyl monomer is maleic anhydride.

* * * * *